United States Patent
Guerra et al.

(10) Patent No.: US 10,533,591 B2
(45) Date of Patent: Jan. 14, 2020

(54) SECURING DEVICE FOR TABLE OR OTHER SURFACE

(71) Applicants: Rene Machado Guerra, West Hills, CA (US); Gisele Borne Garbin Guerra, West Hills, CA (US)

(72) Inventors: Rene Machado Guerra, West Hills, CA (US); Gisele Borne Garbin Guerra, West Hills, CA (US)

(73) Assignee: Rene Machado Guerra, West Hills, CA (US)

( * ) Notice: Subject to any disclaimer, the term of this patent is extended or adjusted under 35 U.S.C. 154(b) by 196 days.

(21) Appl. No.: 15/338,195

(22) Filed: Oct. 28, 2016

(65) Prior Publication Data

US 2017/0122354 A1    May 4, 2017

Related U.S. Application Data

(60) Provisional application No. 62/247,715, filed on Oct. 28, 2015, provisional application No. 62/293,162, filed on Feb. 9, 2016.

(51) Int. Cl.
    *F16B 9/02*          (2006.01)
    *F16B 2/12*          (2006.01)

(52) U.S. Cl.
    CPC ............... *F16B 9/026* (2013.01); *F16B 2/12* (2013.01); *F16B 9/023* (2013.01)

(58) Field of Classification Search
    CPC ............ Y10T 403/39; Y10T 403/3986; Y10T 403/4674; Y10T 403/4682; Y10T 403/4688; Y10T 403/56; F16B 2/06; F16B 2/12; F16B 9/023; F16B 9/052; F16B 9/054; A45B 23/00; A45B 11/00; A45B 2200/1063
    USPC ....... 403/187, 200, 240, 256, 259, 261, 299; 135/16, 117
See application file for complete search history.

(56) References Cited

U.S. PATENT DOCUMENTS

| | | | | |
|---|---|---|---|---|
| 2,437,111 A | * | 3/1948 | McKeige ............ | H02G 3/0616 16/2.1 |
| 2,743,146 A | * | 4/1956 | Wheeler ............... | A45B 23/00 108/50.12 |
| 2,782,085 A | * | 2/1957 | Natale .................. | A47B 3/12 108/158 |
| 3,215,095 A | * | 11/1965 | Keppeler ............... | A45B 3/00 108/50.12 |
| 4,353,659 A | * | 10/1982 | Comte .................. | A47B 37/04 108/50.12 |
| 4,584,946 A | * | 4/1986 | Tucker ................. | A47B 37/04 108/128 |

(Continued)

FOREIGN PATENT DOCUMENTS

FR          2550588 A1 * 2/1985 ............. A47B 37/04

*Primary Examiner* — Daniel J Wiley
(74) *Attorney, Agent, or Firm* — Ferguson Case Orr Paterson

(57) ABSTRACT

Described herein are securing devices configured to hold one object to another. In some embodiments the securing devices are specifically configured to connect an umbrella to a table. The securing devices can comprise a base component configured to receive a first object and one or more support components configured to connect the base component, and thus the first object, to a second object.

19 Claims, 6 Drawing Sheets

(56) References Cited

U.S. PATENT DOCUMENTS

| | | | | | |
|---|---|---|---|---|---|
| 4,724,773 | A | * | 2/1988 | Newberry | A47B 91/08 108/150 |
| 4,920,897 | A | * | 5/1990 | Reed | A47B 37/04 108/150 |
| 5,560,303 | A | * | 10/1996 | Severin | A47B 13/023 108/150 |
| 6,463,946 | B1 | * | 10/2002 | Wu | A47B 11/00 108/50.12 |
| 7,780,139 | B2 | * | 8/2010 | Markert | E04H 12/2261 135/15.1 |
| 8,714,511 | B2 | * | 5/2014 | Zoeteman | A45B 23/00 135/16 |
| 9,795,234 | B2 | * | 10/2017 | Higgins | A47G 23/0208 |
| 2009/0236489 | A1 | * | 9/2009 | Gambill | A45B 23/00 248/539 |
| 2017/0251774 | A1 | * | 9/2017 | D'Abundo | A45B 25/00 |

* cited by examiner

SECURING DEVICE FOR TABLE OR OTHER SURFACE

CROSS REFERENCE TO RELATED APPLICATIONS

This application claims the benefit of U.S. Provisional Patent Application Ser. No. 62/247,715 to Rene Machado Guerra, et al., entitled Tubular Umbrella Stand for Table or Other Surface, filed on Oct. 28, 2015. This application further claims the benefit of U.S. Provisional Patent Application Ser. No. 62/293,162 to Rene Machado Guerra, et al., entitled Securing Device for Table or Other Surface, filed on Feb. 9, 2016. Both of these applications are hereby incorporated herein in their entirety by reference.

BACKGROUND

Field of the Invention

Described herein are devices relating generally to securing objects, such as stands and holders for pole-like objects, for example, umbrella stands and holders for holding or otherwise securing umbrellas. Devices described herein also relate specifically to securing devices and holders configured to connect to or fit with other objects, for example, stands configured to connect to or fit with large stationary objects, such as tables and parked vehicles.

Description of the Related Art

Many objects, for example, pole-like objects including flagpoles and umbrellas need to be secured in order to stand upright and properly perform their respective functions, for example, displaying a flag or banner, or supporting an umbrella such that individuals and objects under it are protected from environmental conditions such a hot sun or adversarial weather.

One problem with conventional securing devices, is that they do not adequately secure an object. Many outdoor tables, for example, in use for outside restaurant seating or in a backyard, have a pre-existing hole near their center that is intended to secure an umbrella to the table by placing the shaft-portion of the umbrella through the pre-existing hole. However, adverse environmental conditions such as strong wind or even clumsy human error of an individual bumping into the umbrella can loosen the umbrella, changing its position or disconnecting it from the table entirely. Additionally, if the winds are sufficiently strong enough, the table itself can be knocked over or moved due to movement of the umbrella.

Furthermore, when an individual attempts to transport a conventional table with an umbrella shaft situated in the table's pre-existing hole, the umbrella may become loose and becomes disconnected from the table. Accordingly, an individual transporting a backyard umbrella-table set will have to take the additional steps of removing the umbrella before transporting the table and then subsequently reconnecting it.

Conventional attempts to correct the above securing issue have utilized permanent connection of one or more components of a table or umbrella base to the ground or another object. An example of this permanent attachment of a portion of a table to the ground is shown in U.S. Pat. No. 4,920,897 to Reed, et al., entitled Beach and Lawn Table with Umbrella Holder. This permanent connection limits the mobility of an umbrella and table set-up and also results in the use of large, bulky components. Aside from the permanent attachment route, conventional attempts to correct this problem also include utilizing bulky and heavy umbrella bases to hold the umbrella in place and limit the movement of the umbrella or its affect on the table.

SUMMARY

Described herein are securing devices configured to secure one object to another. In some embodiments, the securing devices are configured to secure an umbrella to a table such that the effect of forces on the umbrella (and therefore the table), for example, adverse weather conditions such as strong winds, are mitigated. This allows for the umbrella or other objects to be safely secured to another object, such as a table and eliminates the need for an umbrella base.

In one embodiment, a securing device for securing a first object to a second object comprises an at least partially hollow base component comprising an opening configured to receive the first object, and an upper support component comprising a substantially planar surface configured to rest on a surface of the second object.

In another embodiment, a securing device for securing a first object to a second object comprises an at least partially hollow base component configured to receive the first object to be secured to the second object, an upper support component removably connectable to the base component, the upper support component comprising a substantially planar surface, the upper support component further comprising a connection portion configured to fit inside the base component and connect the upper support component to the base component, and a lower support component comprising a substantially planar surface substantially surrounding and integrated into the base component, wherein the securing device is configured such that the substantially planar surface of the upper support component is configured to at least partially align with the substantially planar surface of the lower support component when the upper support component is connected to the base component.

In still another embodiment, a securing device for connecting an umbrella to a table comprises an at least partially hollow base component comprising a base component opening configured to receive a shaft of the umbrella to be secured to the table, the base component configured to fit within a hole in the table, an upper support component removably connectable to the base component, the upper support component comprising a substantially planar surface, the upper support component further comprising a connection portion configured to interact or mate with a corresponding portion of the base component and connect the upper support component to the base component, and a lower support component comprising a substantially planar surface substantially surrounding and integrated into the base component, wherein the securing device is configured such that the substantially planar surface of the upper support component is configured to at least partially align with the substantially planar surface of the lower support component when the upper support component is connected to the base component.

These and other further features and advantages of the invention would be apparent to those skilled in the art from the following detailed description, taken together with the accompanying drawings, wherein like numerals designate corresponding parts in the figures, in which:

DETAILED DESCRIPTION

Figure 1:
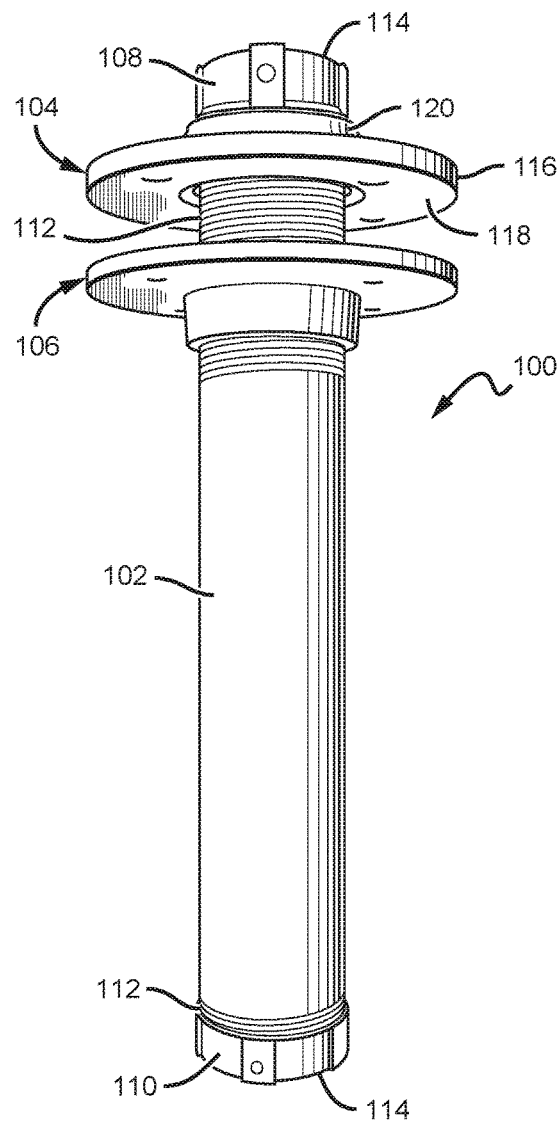
FIG. 1 is a front perspective view of an embodiment of a securing device incorporating features of the present invention.

The present disclosure will now set forth detailed descriptions of various embodiments. These embodiments set forth securing devices comprising at least one base component. The securing devices are configured to secure a first object, for example, an object comprising a pole-like portion such as an umbrella, to another object, for example, a larger object such as a table. These securing devices can further comprise one or more support components and/or attachment components. These securing devices can also further comprise one or more fitting-adjustment components. The various components of securing devices incorporating features will be discussed in more detail with reference to the various figures herein.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present. For example, if an upper support component is said to be connected to a lower support component, which in turn is said to be connected to a base component, it is also correct to say that the upper support component is connected to the base component (through the intervening connection of the lower support component). Furthermore, the upper support component in the previous example would not be "directly" connected to the base component, but would be "directly" connected to the lower support component.

Relative terms, such as "outer," "above," "upper," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

It is understood that when a first element is referred to as being "between," "sandwiched," or "sandwiched between" two or more other elements, the first element can be directly between the two or more other elements or intervening elements may also be present between the two or more other elements. For example, if a first element is "between" or "sandwiched between" a second and third element, the first element can be directly between the second and third elements with no intervening elements or the first element can be adjacent to one or more additional elements with the first element and these additional elements all between the second and third elements.

An embodiment of a securing device 100 incorporating features of the present invention is shown in FIG. 1. The securing device 100 comprises a base component 102 and one or more support components, for example, an upper support component 104 and a lower support component 106. In some embodiments, the securing device 100 can further comprise one or more fitting-adjustment components 108, 110 (two fitting-adjustment components shown). In some embodiments, such as in the embodiment shown in FIG. 1, one or more of the upper support component 104 and/or the lower support component 106 can entirely or substantially surround a portion of the base component 102. It is understood that the term "surround" as used herein in reference to the upper support component 104 and/or the lower support component 106 in relation to the base member includes embodiments wherein the upper support component 104 and/or the lower support component 106 are removably connectable to the base component 102, as well as embodiments wherein the upper support component 104 and/or the lower support component 106 are integrated into the base component 102, forming wing-like protrusions along an exterior perimeter of the base component 102, as shown FIG. 10.

The upper support component 104 and/or the lower support component 106 can be connected to the base component 102 such that it is freely removable and attachable (i.e. removably connected") or can be integrated or otherwise permanently or semi-permanently connected to the base component 102. In some embodiments, such as the embodiments depicted in FIGS. 9-10, either the upper support component 104 or the lower support component 106 can be removably connectable to the base component 102, with the other being permanently connected or integrated into the base component 102. In some embodiments the upper support component 104 and/or the lower support component 106 are both removably connectable to the base component 102, as shown in FIG. 1, or can be both permanently connected or integrated into to the base component 102.

In operation of the securing device 100, the base component 102 can be configured to receive an object to be secured, for example, by attaching to, connecting to, or being shaped to fit the object to be secured. In embodiments wherein the object to be secured comprises a pole-like portion, for example, in the case of an umbrella's shaft or a flag-pole attached to a flag, the base component 102 can comprise an at least partially hollow tube configured to receive the pole-like portion of an object to be secured.

In further description of operation of the securing device 100, the securing device 100 and/or a connected object to be secured can be further connected to an object, for example, a large stationary or semi-stationary object, such as a table, booth, stand, or the tailgate portion of a pickup truck bed. In some embodiments, the base component 102 can slide into a hole or other indentation or cavity portion of the table or other object. This is particularly desirable in the context of connecting and securing umbrellas to tables, as many outdoor tables have a pre-existing hole to place the shaft portion of the umbrella.

The base component 102 can then be placed within the hole or indentation of the table or other object and the upper support component 104 and the lower support component 106 can be configured such that the base component 102 is substantially held in place, for example, by positioning the table between the upper support component 104 and the lower support component 106 such that the table is sandwiched between the two components 104, 106.

The various components of the securing device 100, including the base component 102 the support components 104, 106 and the fitting-adjustment components 108, 110 can comprise any material suitable for securing one object in place and connecting it to another object. For example, in embodiments wherein the securing device 100 is utilized to secure an umbrella to a table, the securing device 100 can comprise any material that is sufficiently sturdy to hold a connected umbrella substantially in place in relation to the table, for example, holding the umbrella substantially in place such that a strong wind will not disconnect the umbrella from the securing device 100 or the securing device 100 from the table.

Some suitable materials the various components of the securing device 100 can comprise include, but are not limited to: resin, rubber, vinyl, polyurethane, poly vinyl chloride (PVC), Poly(methyl methacrylate) (PMMA), polystyrene foam, polymers/copolymer substances, acrylic substances, plastic, leather, metal, glass, fiberglass, wood, cloth, combinations thereof, or any other suitable material that can support the structure and function of the securing device 100, as set forth in the present disclosure.

While the various components of the securing device 100 are shown comprising certain shapes, other shapes are possible to utilize with embodiments incorporating features of the present disclosure. For example, the securing device 100 in FIG. 1 is shown comprising a substantially cylindrical base component 100 and substantially circular support components 104, 106 and fitting-adjustment components 108, 110, which are configured such that they can fit at least partially around the base component 102.

While this FIG. 1 configuration provides advantages of easy installing of the securing device 100 into a hole or indentation of an object such as a table, as well as easily fitting together of the various device components, other shapes are possible including, for example, any regular or irregular polygon. In some embodiments, the base component 102 is substantially square, rectangular or diamond-shaped and the resulting edges of the base component can comprise a pressure-fit against the interior of a hole or indentation of a table or other object.

The support components 104, 106 and/or the fitting-adjustment components 108, 110 can be configured to connect to the base component 102 in a variety of ways, with the preferable connection being a connection that allows for convenient disconnection and reconnection capability and/or the ability to move in relation to the base component while remaining connected. Some suitable connection configurations include, but are not limited to: hook and loop structures (such as Velcro®), button structures, snap-fit structures, adhesives, various fasteners (e.g. screws, nails, nuts and bolts), a hinge or living hinge arrangement and a vertical and or horizontal rotational movement arrangement.

In some embodiments, for example, in the embodiment shown in FIG. 1, the support components 104, 106 and/or the fitting-adjustment components 108, 110 can be configured to connect to the base component 102 through comprising complementary portions that interact or mate with each other, for example, various male-female snap-fit or thread connections, for example, tapered thread connections. In the embodiment shown, the support components 104, 106 and the fitting-adjustment components 108, 110 are configured to connect to the base component 102 via a male-female tapered thread connection, similar to that employed by a garden hose to connect to an outdoor faucet or spigot.

In the embodiment shown in FIG. 1, the base component comprises one or more connection portions 112 (two shown) that are configured to interact or mate with a corresponding structure on the support components 104, 106 and/or the fitting-adjustment components 108, 110. Multiple connection portions 112 can be configured such that they utilize the same connection configuration or they can be configured such that one or more instances of the connection portions 112 utilize different connection configurations. For example, one connection portion 112 may comprise a male-female thread connection structure whereas another may comprise a snap-fit connection structure. It is understood that in some-embodiments, the base component 102 can comprise internal structures that can be configured similarly to the fitting-adjustment components 108, 110, for example comprising structures configured to provide an internal pressure-fit to a connected object, such as an umbrella. These structures can be utilized in lieu of or in addition to the fitting-adjustment components 108, 110.

In the embodiment shown in FIG. 1, the connection portions 112 of the base component 102 comprise a male thread connection and the support components 104, 106 and the fitting-adjustment components 108, 110 comprise areas of female thread connection, allowing these components to at least partially surround, and become at least partially screwed in place with, the connection portion 112 of the base component 102. In the embodiment shown in FIG. 1, the tapered thread connection utilizes the National Pipe Thread Taper (NPT) standard, although it is understood that other measurements of the thread are within the scope of the present disclosure.

The above-mentioned male-female thread connection configuration allows the upper support component 104 and the lower support component 106 to rotate about the base component 102 and move vertically in relation to the base component 102 along its length and along the connection portion 112 to which the support components 104, 106 are connected. This allows the upper support component 104 to move farther from or nearer to the lower support component 106, and vice versa, by rotating the support components 104, 106 in relation to the base component 102. This rotation can be done manually, or in embodiments utilizing more complex features, for example, electronics, automatically.

Figure 4:
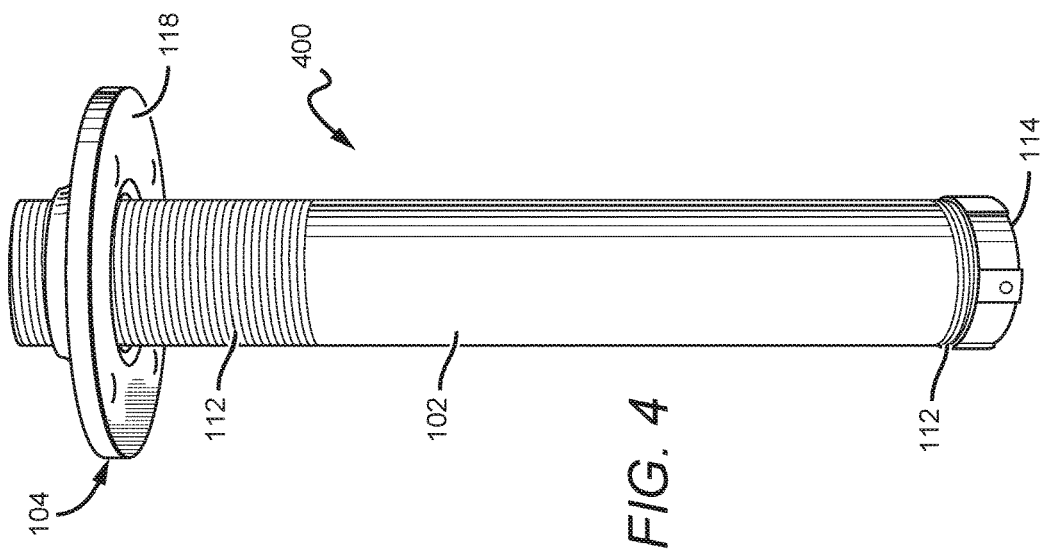
FIG. 4 is a front perspective view of a second embodiment of a securing device incorporating features of the present invention.

By being configured such that the upper support component 104 and the lower support component 106 can be moved farther away from one another, the space between the two support components 104, 106 can be adjusted such that varying thicknesses of a table or other object can be accommodated between the support components 104, 106 such that the support components can hold the table or other objects snugly between themselves as is shown more clearly in FIG. 4, described in more detail further herein.

In some embodiments, the upper support component 104 and the lower support component 106 are positioned such that at least a portion of them, for example planar surfaces of the upper support component 104 and the lower support component 106, are at least partially aligned and face one another when the upper support component 104 and the lower support component 106 are both connected to the base component 102. In some embodiments, portions of the upper support component 104 and the lower support components 106 can be substantially or completely aligned with one another. In operation of the securing device of FIG. 1, a user can disconnect the upper support component 104 and/or the lower support component 106 (as well as one or more of the fitting-adjustment components 108, 110 if utilized) and place a portion of the base component 102 through a hole or indentation in an object, such as a table. The user can then reattach the upper support component 104 and/or the lower support component 106 that was previously detached such that the table or other object is securely sandwiched between the upper support component 104 and the lower support component 106. The umbrella shaft or other pole-like portion of a connected object can be placed within the at least partially hollow base component 102 either before, after or during connection of the securing device 100 to the table or other object.

It is understood that in some embodiments, only the base component comprises a connection portion or only one or more of the support components 104, 106 and/or the fitting-adjustment components 108, 110 comprise connection portions. In some embodiments, the support components 104, 106 and/or the fitting-adjustment components 108, 110 can open and close around the base component 102, for example, by pivoting on an internal hinge at one end and comprising a snap-fit or other locking mechanism at the other end.

The base component 102 can be configured to accept an object to be secured and connected to another object. In the embodiment shown in FIG. 1, the base component is a substantially hollow cylinder with a diameter sufficient to receive an umbrella shaft and with openings 114 at both ends, although it is understood that in other embodiments, the base component may be only partially hollow and/or closed at one end.

Common outdoor umbrella shafts typically comprise a diameter of approximately 1.35" for smaller umbrellas and comprise a diameter of approximately 1.5" for larger umbrellas. Accordingly, in some embodiments, the diameter of the openings 114 of the base component 102 can be 1.5" to around 2". In some embodiments, the diameter of the openings 114 of the base component is 1.75". While these specific measurements are recited, it is understood that any diameter that is sufficient to allow a desired object, for example, an umbrella shaft, to be placed within the at least partially hollow portion of the base component 102 is sufficient, with a preferable diameter being configured to snugly hold the umbrella shaft to limit or prevent substantial movement.

During adverse weather conditions such as strong winds, force is applied to the tarp-portion of a connected umbrella, which in turn moves the umbrella shaft. When the umbrella is directly placed within the centralized hole in an outdoor table, this often results in the umbrella being pulled from the table. As the umbrella shaft is positioned within the base component 102, movement of the umbrella shaft results in the umbrella shaft abutting against the inner walls of the base component 102, which is further secured by being connected to the table. This results in the securing device 100 essentially converting the table itself into an umbrella base.

The support components 104, 106 are configured to facilitate connection of the securing device 100 to a table or other object, although it is understood that in some embodiments, the support structures 104, 106 are not utilized and instead the base component 102 is simply connected directly to the table or other object, or another connection structure is utilized. In some embodiments, one of more of the support components 104, 106 are not separate structures from the base component 102, but are instead part of or otherwise integrated with the base structure 102.

In the embodiment shown in FIG. 1, the support components 104, 106 are separate components that are removable and connectable to a connection portion 112 of the base component 102 via a male-female thread connection as discussed above. In the embodiment shown, the support components 104, 106 each comprise a single portion of material that has been shaped such that it comprises a disk portion 116, comprising a substantially planar or otherwise flat face 118 and a raised portion 120, which houses the corresponding female thread structures for connecting the male thread structures of the connection portion 112 of the base component 102 and can extend or otherwise protrude from the planar portions of the disk portion 116. It is understood that while this application described the raised portion 120 as being "raised," (i.e. raised from the substantially planar face 118, in some embodiments, the raised portion 120 can be substantially flush with the planar surfaces of the disk portion 116 and not protrude or extend from the disk portion 116.

The upper support component 104 and the lower support component 106 are essentially inverted versions of one another wherein one support component is positioned in relation to the other such that the substantially planar face 118 of one faces the face of the other. This allows for the planar face portions 118 of each support component 104, 106 to face a connected table to maximize connection surface area while the table is sandwiched between them. As discussed above, rotational movement of the support components 104, 106 cause them to move up or down the connection portion 112 of the base component 102 by virtue of the female thread connections of the support components 104, 106 "climbing" the thread of the male thread connections of the connection portion 112 of the base component 102.

The fitting-adjustment components 108, 110, when utilized, function to further narrow the diameter of the openings 114 of the base component 102 to provide a more snug fit for a connected object, such as an umbrella, or to allow for multiple different sizes of objects to be connected. For example, the securing device 100 can be marketed or sold with a large 2" diameter opening 114 in the base component 102 and be primarily designed for use with larger umbrellas with thicker shafts. Included with the product can be one or more fitting-adjustment components 108, 110, which can connect to the base component 102, for example, by utilizing the male-female connection or another connection discussed above, which can serve as an adaptor to allow the larger diameter base component 102 to be utilized with smaller umbrellas. In some embodiments, one or more of the fitting-adjustment components 108, 110 can be sealed at one end to effectively close one or more of the openings 114 of the base component 102.

Figure 2:
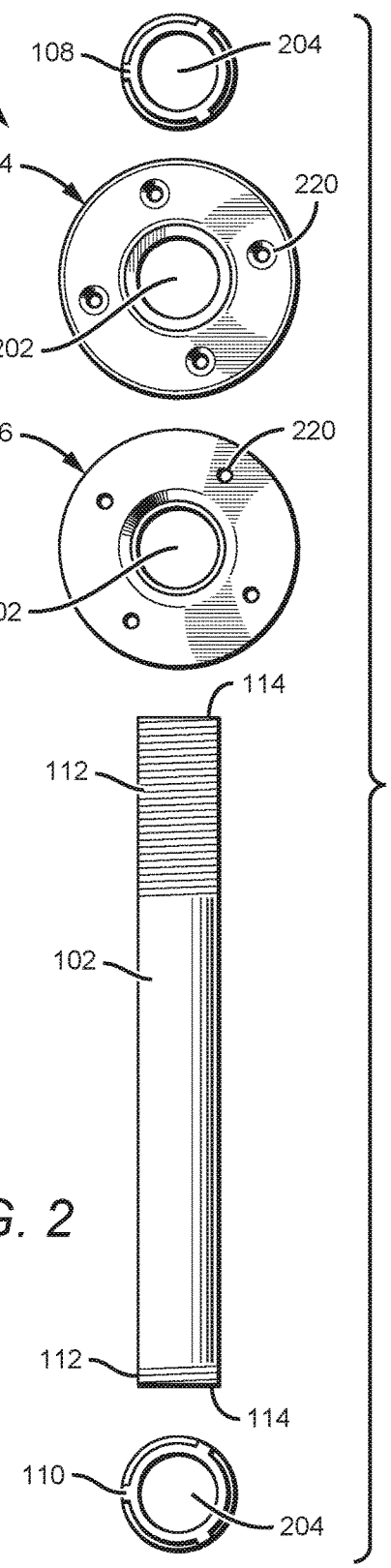
FIG. 2 is an exploded view of the embodiment of the securing device of FIG. 1.

The interaction between the various components of the securing device 100 can be viewed clearly in FIG. 2, which shows an exploded view of the securing device 100, comprising the base component 102 (which comprises the connection portions 112 and the openings 114), the upper support component 104, the lower support component 106, and the fitting-adjustment components 108, 110. As can be seen in FIG. 2, the support components 104, 106 comprise support openings 202, which are larger in diameter than the base component 102, allowing these support components 104, 106 to fit around the base component 102. The fitting-adjustment components 108, 110 each comprise a tapered adjustment opening 204, which is smaller in diameter than the openings 114 in the base component 102. Since the adjustment openings 204 are tapered, the opening at the lower portion of the fitting-adjustment components 108, 110 can be larger and can fit around the base component 102 and then narrow near the upper portion of the fitting-adjustment components 108, 110 to reduce the effective diameter of the openings 114 of the base component 102 with respect to a connected object, such as an umbrella shaft.

Also shown in FIG. 2. is that the support components 104, 106 can optionally comprise alignment holes 220. The alignment holes 220 can be configured to align with one another when the support components 104, 106 are connected to the securing device 100. In some embodiments, fasteners such as wood screws can be placed within aligned instances of alignment holes 220 while a table is sandwiched between the upper support component 104 and the lower support component 106, therefore permanently or semi-permanently connecting the securing device 100 to the table or other object.

Figure 3:
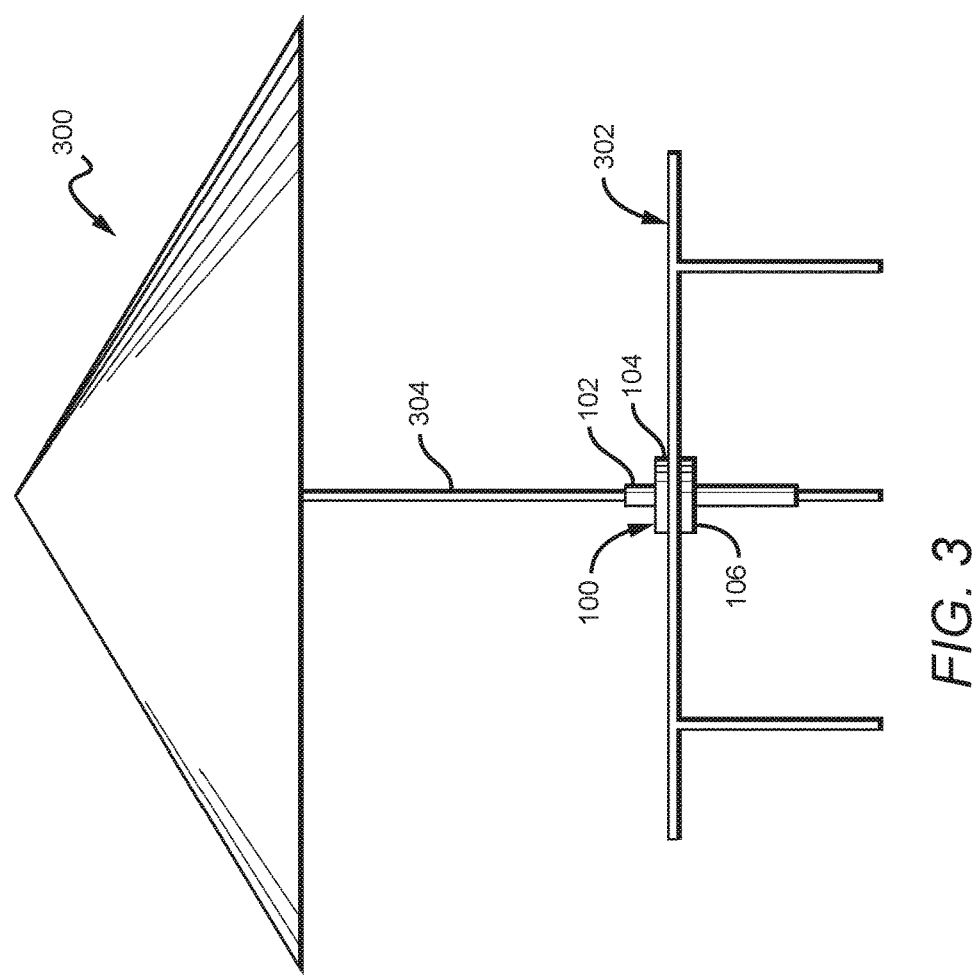
FIG. 3 is a front view of the embodiment of the securing device of FIG. 1, shown connected to a table and shown securing a connected umbrella.

FIG. 3 shows the securing device 100 of FIGS. 1-2 in an example operation securing an umbrella 300 and connecting it to an object, in this case a table 302. As shown in FIG. 3, the base component 102 is placed within a hole in a table 302. The umbrella's shaft 304 is placed within the hollow base component 102. The table 302 is sandwiched between the upper support component 104 and the lower support component 106.

In addition to illustrating an example operation of the securing device 100, FIG. 3 also illustrates the size and compact nature of the securing device 100 in relation to the table. As can be seen in FIG. 3, the securing device can be easily removed from the table, for example, by rotating the support components 104, 106 such that they travel away from one another and release the portion of the table trapped between them. This allows for easy detachment, reattachment and transport of the securing device 100, allowing for convenient replacement of umbrellas or tables.

Another embodiment incorporating features of the present invention is shown in FIG. 4, which shows a securing device 400, similar to the securing device 100 in FIGS. 1-3 above, which also comprises a base component 102 (which comprises connection portions 112 and the opening 114) and an upper support component 104. Unlike the securing device 100 in FIG. 1, the securing device 400 in FIG. 4 does not comprise a lower support structure. In operation of the securing device 400 of FIG. 4, the base component 102 is placed within a hole or indentation in an object such as a table, such that the planar face portion 118 of the upper support component 104 abuts against the top portion of the table. In these embodiments, the securing device 400 can stay securely connected to the table in a variety of ways.

In a preferred embodiment, the securing device 400 can simply comprise a material of sufficient weight and/or sturdiness such that a force equivalent to a strong wind would not be sufficient to remove the securing device 400 from the connected table or other object. In other embodiments, one or more portions of the upper support component 104 can be configured to connect to the table or other object through any connection configuration recited herein or any known connection configuration. In some embodiments, the face 118 of the upper support component 104 can be connected to the top of a table or other object through the use of an adhesive or a hook and loop structure (such as Velcro®).

Figure 5:
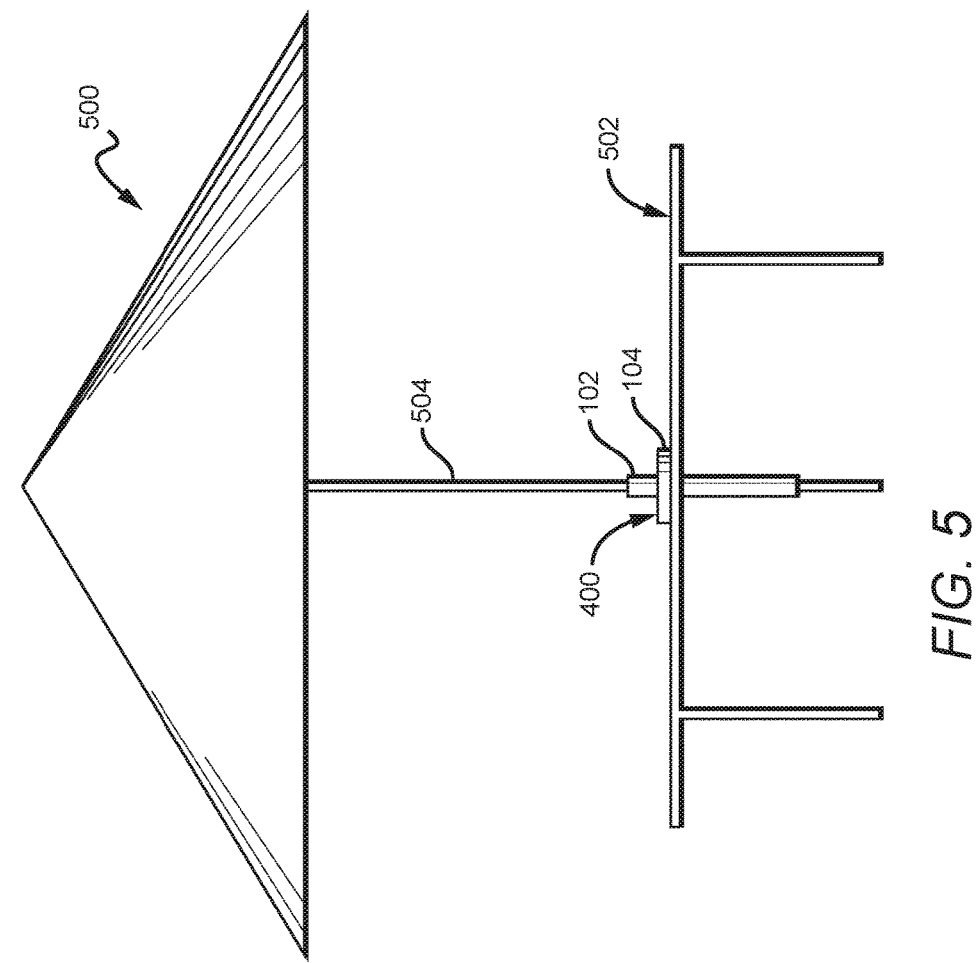
FIG. 5 is a front view of the embodiment of the securing device of FIG. 4, shown connected to a table and shown securing a connected umbrella.

FIG. 5 shows the securing device 400 of FIG. 4 in an example operation securing an umbrella 500 and connecting it to an object, in this case a table 502. As shown in FIG. 5, the base component 102 is placed within a hole in a table 502. The umbrella's shaft 504 is placed within the hollow base component 102. The upper support portion 104 rests on top of the table 502.

Figure 6:
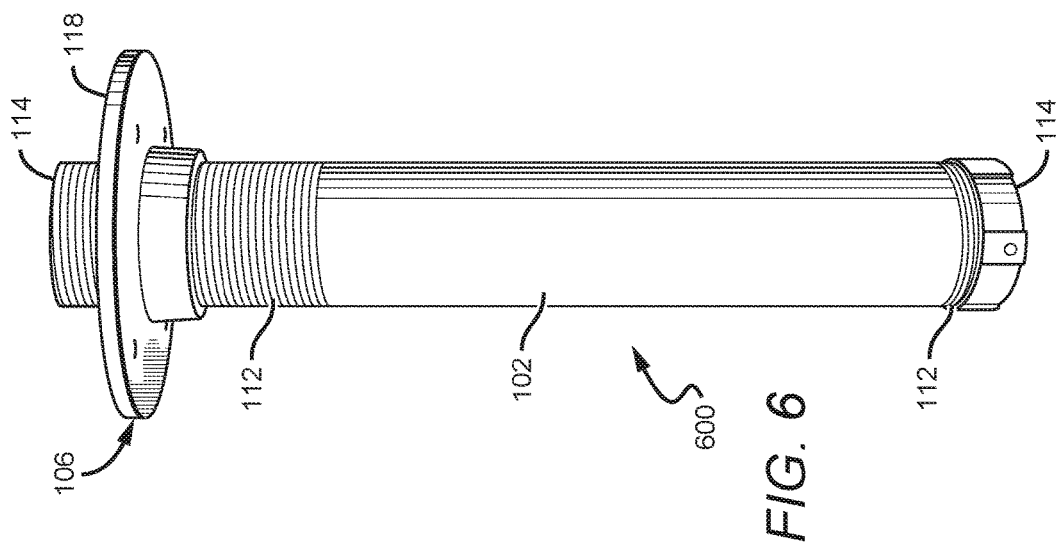
FIG. 6 is a front perspective view of a third embodiment of a securing device incorporating features of the present invention.

Another embodiment incorporating features of the present invention is shown in FIG. 6, which shows a securing device 600, similar to the securing device 100 in FIGS. 1-3 above, which also comprises a base component 102 (which comprises connection portions 112 and the openings 114) and an lower support component 106. Unlike the securing device 100 in FIG. 1, the securing device 600 in FIG. 6 does not comprise an upper support structure. In operation of the securing device 600 of FIG. 6, the base component 102 is placed within a hole or indentation in an object such as a table, such that the substantially planar face portion 118 of the lower support component 106 abuts against the bottom portion of the table. In these embodiments, the securing device 600 can stay securely connected to the table in a variety of ways. In some embodiments, one or more portions of the lower support component 106 can be configured to connect to the table or other object through any connection configuration recited herein or any known connection configuration. In some embodiments, the substantially planar face 118 of the lower support component 106 can be connected to the top of a table or other object through the use of an adhesive or a hook and loop structure (such as Velcro®).

Figure 7:
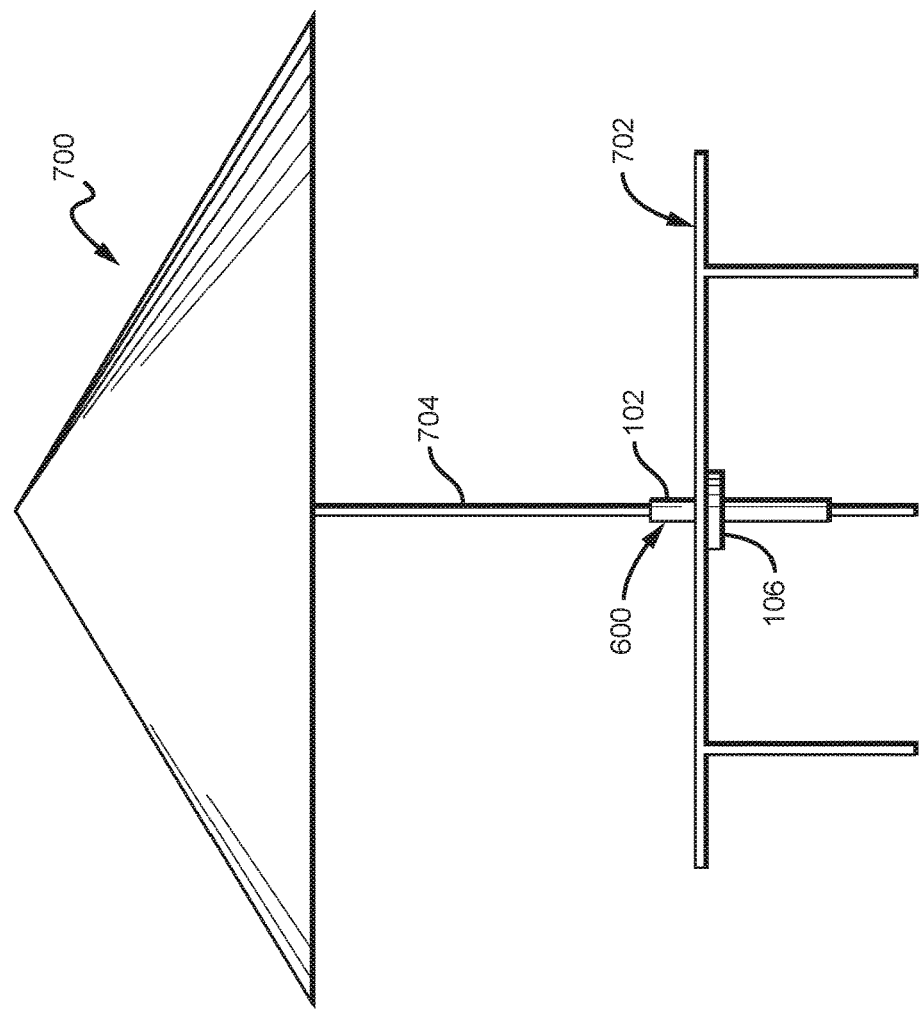
FIG. 7 is a front view of the embodiment of the securing device of FIG. 6, shown connected to a table and shown securing a connected umbrella.

FIG. 7 shows the securing device 600 of FIG. 6 in an example operation securing an umbrella 700 and connecting it to an object, in this case a table 702. As shown in FIG. 7, the base component 102 is placed within a hole in a table 702. The umbrella's shaft 704 is placed within the hollow base component 102. The lower support portion 106 abuts against and is connected to the bottom of the table 702.

Figure 8:
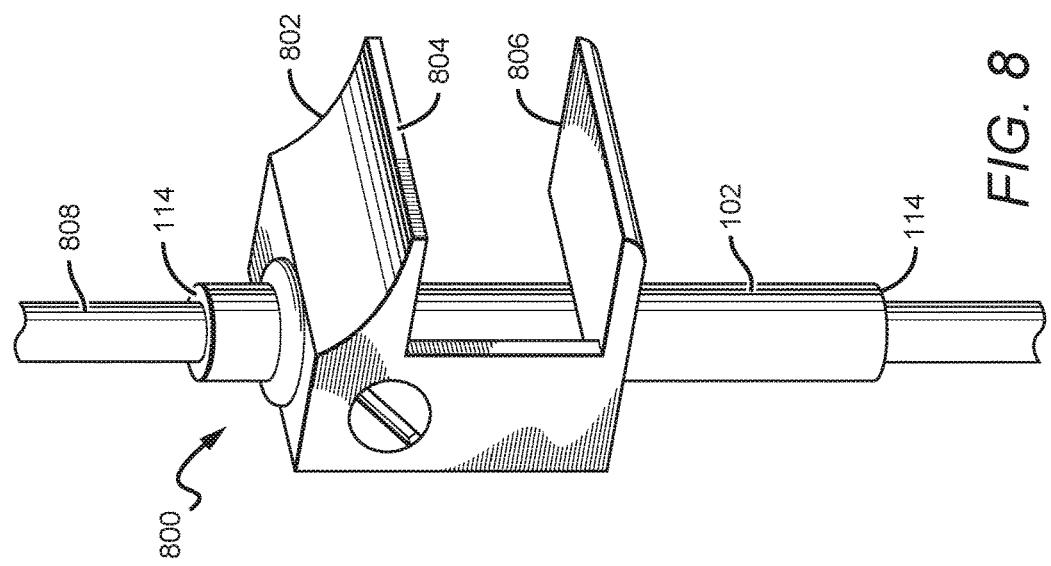
FIG. 8 is a partial front perspective view of a fourth embodiment of a securing device incorporating features of the present invention.

As mentioned above, the base component 102 can be connected to a table or other object through a variety of configurations. FIG. 8 shows another such configuration. FIG. 8 shows a securing device 800, similar to the securing device 100 in FIGS. 1-3 above, which also comprises a base component 102 (which comprises openings 114). Unlike the securing device 100 in FIG. 1, the securing device 800 in FIG. 8 does not comprise an upper or lower support structure. Instead, the base component 102 can be connected to a table or other object through a clamp structure 802. The clamp structure 802 can be connected to the base component utilizing any connection configuration recited herein, including any connection configuration utilized for the upper and lower support structures, for example, a male-female thread connection. The clamp structure 802 can comprise a first jaw 804 and a second jaw 806. The clamp structure is configured to connect to an object, such as a table, for example, by surrounding an edge of the table with the first and second jaws 804, 806.

In some embodiments, the first and second jaws 804, 806 are fixed and immobile and in other embodiments the first and second jaws 804, 806 can be configured with the clamp structure 802 such that they can be moved closer or farther apart to respectively tighten or loosen the grip of the clamp structure on the connected table or other object. FIG. 8 further shows a portion of an umbrella shaft 808 within the base component 102 for reference purposes.

It is understood that in some embodiments, the various device components, for example, the base component, the upper support component and the lower support component, can comprise features allowing them to be removably connectable to one another in additional ways than being around a portion of the base component or other ways described above. An example of such an embodiment is set forth in FIG. 9, which shows a securing device 900, comprising a base component 902 an upper support component 904 and a lower support component 906, which are similar to the upper and lower support components 104, 106 set forth in FIGS. 1-3 above.

Unlike the support components of FIGS. 1-3, the upper support component 904 comprises its own connection structure 908, that can be integrated into or otherwise permanently or temporarily connected to the upper support component, and can be configured to interact or mate with a corresponding connecting structure in and/or on the base component 902 and/or the lower support component 906. Like with the embodiment shown in FIG. 1, the upper support structure 904 and the lower support structure 906 can be configured such that the upper support component 904 and the lower support component 906 can be moved farther away from one another, such that the space between the two support components 904, 906 can be adjusted such that varying thicknesses of a table or other object can be accommodated between the support components 904, 906 such that the support components can hold the table or other objects snugly between themselves.

Figure 9:
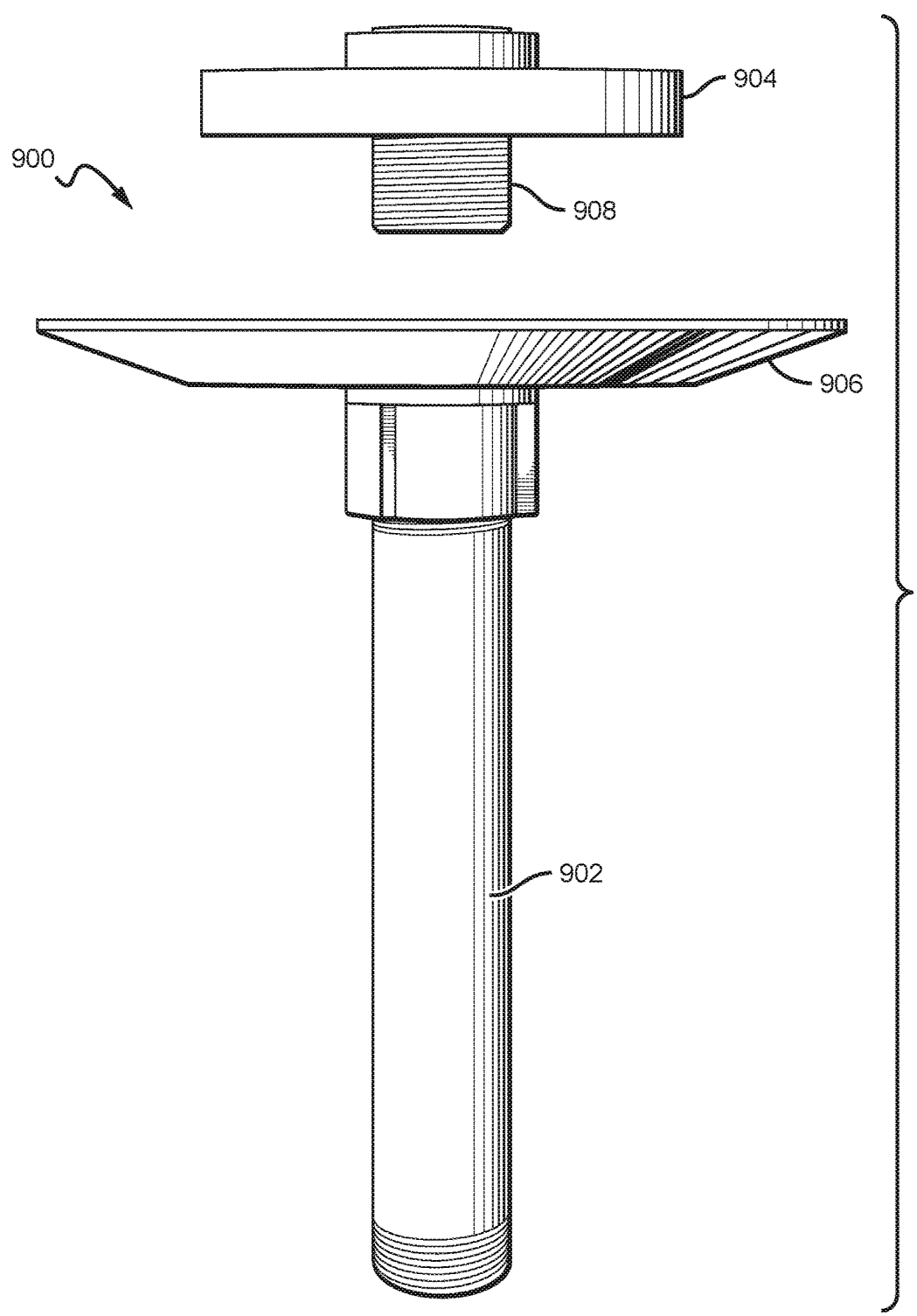
FIG. 9 is a partial exploded view of a fifth embodiment of a securing device incorporating features of the present invention.

In some embodiments, including the embodiment shown in FIG. 9, the base component 902 can be integrated with, or otherwise connected to, permanently or temporarily, the lower support component 906. In some embodiments, including the embodiment shown, this configuration significantly reduces the number of parts of the securing device 900, enhancing portability, ease of assembly and disassembly, and reducing the chance of malfunction due to the reduction of component pieces, as there are less parts that can be damaged. In the embodiment shown, the securing device can be limited to a smaller number of component parts, for example, two to three component parts.

An example of this reduction in the number of components includes two components and an optional component: 1) an upper support portion 904 with its own connected or integrated connection structure 908; 2) a base component 902 with a connected or integrated lower support structure 906; and 3) one or more an optional fitting-adjustment components, which can connect to the securing device 900 and function similarly to fitting-adjustment components 108 discussed in reference to FIG. 1 above. Additionally, in other embodiments, the lower support component 906 can comprise its own connection structure (not depicted in the drawings), which can, similarly to connection structure 908 of the upper support component 904, interact with other features to facilitate connection, for example, by interacting or otherwise mating with a corresponding connecting structure in and/or on the upper support component 904.

Figure 10:
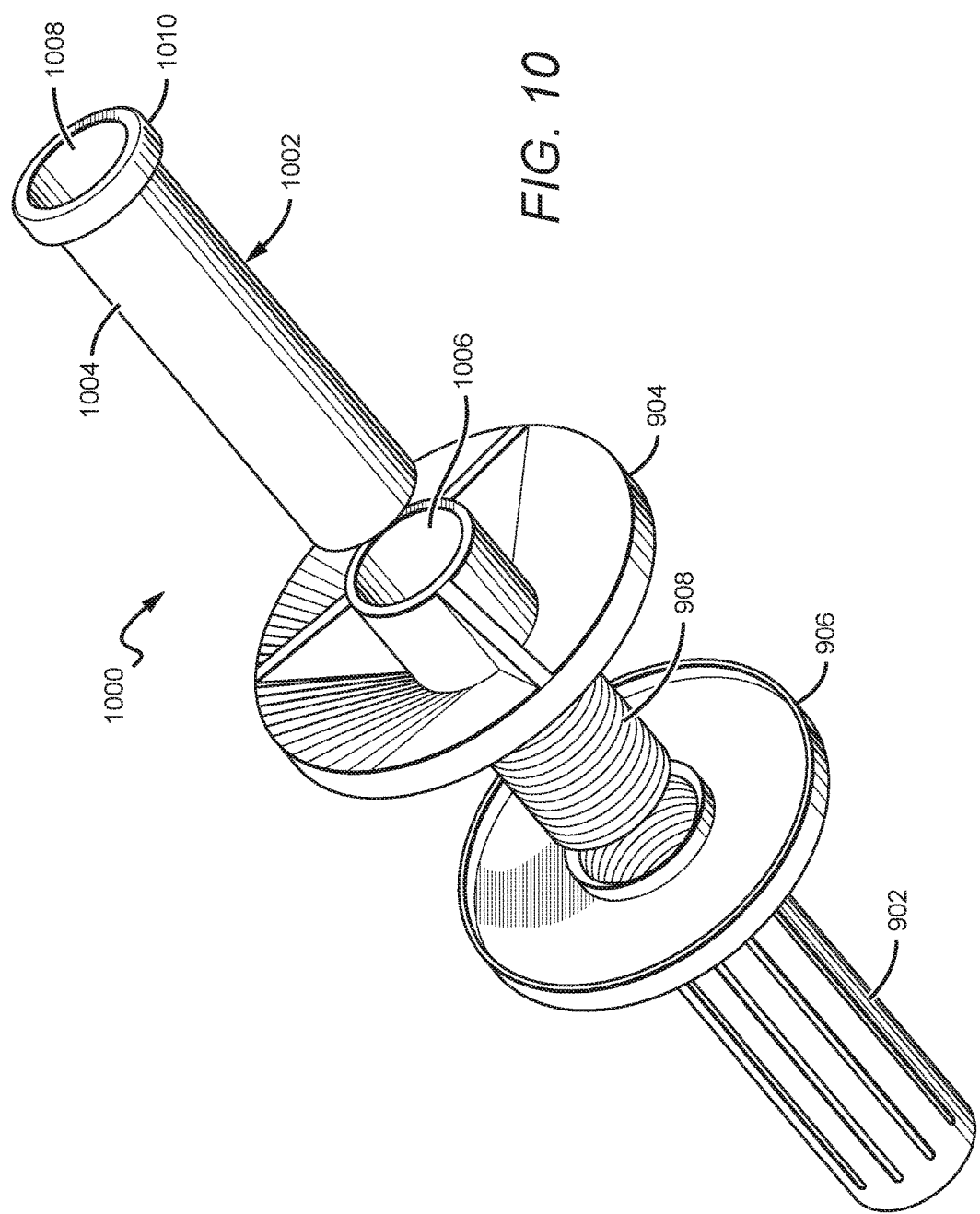
FIG. 10 is an exploded view of a sixth embodiment of a securing device incorporating features of the present invention.

There are many different embodiments incorporating the "reduced component" features of the embodiment shown in FIG. 9 above and these "reduced component" features can be incorporated into any of the embodiments shown in FIG. 1-8 as well. FIG. 10 shows another such embodiment of a securing device 1000, similar to the securing device 900 in FIG. 9 above, wherein like reference numerals are utilized to denote like features. Like with the securing device 900 above, the securing device 1000 of FIG. 10 comprises a base component 902 an upper support component 904 comprising its own connection structure 908, and a lower support component 906, which all are configured to and can function similarly.

FIG. 10 further shows an elongated fitting-adjustment component 1002, which is similar to the fitting-adjustment components 108 in the securing device 100 of FIG. 1 above and can similarly be utilized to adjust the diameter of an opening 1006. Unlike the fitting-adjustment components 108 of the securing device 100 of FIG. 1, the elongated fitting-adjustment component 1002 comprises an extended portion 1004 that is configured to enter the opening 1006 of the upper support component. In the embodiment shown, the elongated fitting-adjustment portion is cylindrical, although other shapes can be utilized. In one mode of operation of the securing device 1000, a user can place an object, such as an umbrella shaft, into a fitting-adjustment opening 1008, such that the umbrella shaft is held snugly by the fitting-adjustment component 1002 and its extended portion 1004. The umbrella shaft and the extended portion 1004 can be placed into the upper support component opening 1006, which the umbrella shaft (and in some embodiments the extended portion 1004 of the elongated fitting-adjustment component 1002) being surrounding by the connection structure 908. The umbrella shaft, along with the connection structure 908, can then enter the lower support component 906, as with other embodiments disclosed herein. As with other embodiments disclosed herein, a table or other structure can be sandwiched between the upper support component 904 and the lower support component.

At least some advantages of this elongated fitting-adjustment component 1002 embodiment is that the component 1002 can be configured to increase the surface area of the portion of the umbrella shaft held in contact with it. For example, an attached object can be held along a greater length of the object, for example, a substantial portion of the object such as a quarter of the object's length, making the connection more stable and secure. For example, a greater length of an umbrella shaft can be more snugly fitted to the correct diameter for optimum securing. Additionally, the elongated fitting-adjustment component 1002 can be attached to an object before entering the upper support component opening 1006, allowing for ease of alignment between the components. For example, the upper support component 904 and the lower support component 906 can be connected to a table. A user can then connect the elongated fitting-adjustment component 1002 to an umbrella shaft and connect the umbrella shaft and elongated fitting-adjustment component 1002 to the upper support component 904 and the lower support component 906 (and therefore the table) by placing the elongated fitting-adjustment component 1002 and connected umbrella shaft through the upper support component opening 1006. In some embodiments, the elongated fitting-adjustment component 1002 also comprises a raised lip portion 1010, which can rest against the outer perimeter of the upper support component opening 1006, to allow the elongated fitting-adjustment component 1002 to efficiently be held in place and not completely slide through the upper support component opening 1006.

The above connection configuration can utilize any of the disclosed connection configurations herein or any connection configuration known in the art. In the embodiment shown, the connection configuration is a thread connection mechanism. It is understood that in other embodiments, the lower support component 906 can be likewise removable and connectable to the base component 902 and/or the upper support component 904.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in any claims.

We claim:

1. A securing device for securing a first object to a second object, comprising:
    an at least partially hollow base component defining a substantially cylindrical opening configured to receive said first object;
    a lower support component removably connectable to or integral with said base component such that said base component is at least partially within said lower support component, said lower support component comprising a substantially planar surface configured to engage a first surface of said second object;
    an upper support component connectable to one or both of said base component and said lower support component so as to be at least partially within said base component, said upper support component comprising a substantially planar surface configured to engage a second surface of said second object opposite said first surface; and
    a fitting-adjustment component comprising an extended portion configured to enter an opening of said upper support component.

2. The securing device of claim 1, wherein said upper support component is removably connectable to said base component.

3. The securing device of claim 2, wherein said upper support component and said base component comprise complementary male-female threaded structures allowing for connection of said upper support component to said base component.

4. The securing device of claim 1, wherein said upper support component is connected to said base component by complementary male-female threaded structures.

5. The securing device of claim 1, wherein said lower support component is removably connectable to said base component.

6. The securing device of claim 1, wherein said lower support component is integrated with said base component.

7. The securing device of claim 1, wherein said substantially planar surface of said upper support component is configured to at least partially align with said substantially planar surface of said lower support component when said upper support component is connected to one or both of said base component and said lower support component.

8. The securing device of claim 1, wherein said fitting-adjustment component is configured to fit in said opening of said upper component so as to alter an operable diameter of said opening in said upper component.

9. The securing device of claim 8, wherein said fitting-adjustment component is substantially an elongated cylinder shape.

10. The securing device of claim 1, wherein said lower support component defines a substantially cylindrical opening;
    wherein said upper support component defines a substantially cylindrical opening; and
    wherein said securing device is configured such that when said base component, said lower support component, and said upper support component are connected to one another, a contiguous opening is formed by at least said opening in said base component and said opening in said upper support component.

11. A securing device for securing a first object to a second object, comprising:
    a hollow base component defining a base component opening, said base component configured to receive said first object in said base component opening;
    an upper support component removably connectable to said base component, said upper support component comprising a connection portion configured to fit inside said base component opening and connect said upper support component to said base component via a threaded connection;
    a lower support component defining a lower support component opening and comprising a substantially planar surface; and an elongated fitting-adjustment component comprising an extended portion configured to enter an opening of said upper support component;

wherein said lower support component opening and an outside of said base component are configured to connect via a threaded connection.

12. The securing device of claim 11, wherein said base component is substantially cylindrical.

13. The securing device of claim 11, wherein said upper support component comprises a substantially planar surface configured to rest on a surface of said second object.

14. The securing device of claim 11, wherein said upper support component and said lower support component are configured to sandwich said second object between them to hold said base component to said second object.

15. A securing device for connecting an umbrella to a table, comprising:

an at least partially hollow base component comprising a base component opening configured to receive a shaft of said umbrella to be secured to said table;

an upper support component removably connectable to said base component, said upper support component comprising a substantially planar surface, said upper support component further comprising a connection portion configured to fit within said base component opening and connect said upper support component to said base component;

a lower support component comprising a substantially planar surface, wherein said securing device is configured such that said substantially planar surface of said upper support component at least partially aligns with said substantially planar surface of said lower support component when said upper support component and said lower support component are connected to said base component; and an elongated fitting-adjustment component comprising an extended portion configured to enter an opening of said upper support component.

16. The device of claim 15, wherein said connection portion comprises a threaded structure and said base component opening comprises a complementary threaded structure such that said connection portion and said base component opening fit together in a male-female connection.

17. The device of claim 16, wherein said lower support component comprises a lower support component opening comprising a threaded structure, and an outside of said base component comprises a complementary threaded structure such that said outside of said base component and said lower support component opening fit together in a male-female connection.

18. The device of claim 16, wherein said connection portion is hollow.

19. The device of claim 15, wherein said lower support component is integrated into said base component.

* * * * *